United States Patent [19]

Lenhart

[11] Patent Number: 4,816,311
[45] Date of Patent: Mar. 28, 1989

[54] RECORDING MEDIUM THAT CAN BE MAGNETIZED VERTICALLY AND METHOD FOR MANUFACTURING SAME

[75] Inventor: Armin Lenhart, Erlangen, Fed. Rep. of Germany

[73] Assignee: Siemens Akteingesellschaft, Berlin and Munich, Fed. Rep. of Germany

[21] Appl. No.: 120,731

[22] Filed: Nov. 12, 1987

Related U.S. Application Data

[63] Continuation of Ser. No. 840,877, Mar. 18, 1986, abandoned.

[30] Foreign Application Priority Data

Mar. 29, 1985 [DE] Fed. Rep. of Germany ....... 3511657

[51] Int. Cl.$^4$ ............................................... G11B 5/70
[52] U.S. Cl. ................................. 428/64; 156/306.6; 156/330; 427/128; 427/129; 427/130; 427/131; 427/132; 428/65; 428/215; 428/216; 428/141; 428/415; 428/426; 428/694; 428/900
[58] Field of Search ................... 428/64, 65, 141, 900, 428/694, 695, 426, 415, 336, 335, 334, 215, 216; 427/128, 129, 130, 131, 132; 156/306.6, 330

[56] References Cited

U.S. PATENT DOCUMENTS

| | | | |
|---|---|---|---|
| 4,254,189 | 3/1981 | Fisher | 428/900 |
| 4,287,544 | 9/1981 | Lazzari | 360/131 |
| 4,411,963 | 10/1983 | Aine | 428/900 |
| 4,659,606 | 4/1987 | Wada | 428/64 |
| 4,690,846 | 9/1987 | Wada | 428/64 |

FOREIGN PATENT DOCUMENTS

| | | |
|---|---|---|
| 0054640 | 10/1981 | European Pat. Off. . |
| 0126790 | 5/1983 | European Pat. Off. . |
| 3014718 | 10/1981 | Fed. Rep. of Germany . |
| 3129210 | 5/1982 | Fed. Rep. of Germany . |
| 3140344 | 8/1982 | Fed. Rep. of Germany . |
| 2923682 | 11/1983 | Fed. Rep. of Germany . |
| 2542900 | 9/1984 | France . |

OTHER PUBLICATIONS

IEEE Transactions on Magnetics, vol. MAG-16, No. 1, Jan. 1980, pp. 71 to 76.
DIN 4762, May 1978, pp. 1-15.
J. M. Brownlow et al., "Magnetic Film Substrate", *IBM Tech. Disclosure Bull.*, vol. 7, No. 3, Aug. 1964.

*Primary Examiner*—Ellis P. Robinson
*Attorney, Agent, or Firm*—Kenyon & Kenyon

[57] ABSTRACT

A recording medium which can be magnetized vertically contains a plate-shaped carrier body of nonmagnetic material of which at least one flat side is provided with a thin nonmagnetic intermediate layer having a very smooth surface, to which at least one magnetic recording layer of a material is applied, the axis of easy magnetization of which points in a direction perpendicular to the surface of the medium. The surface of this intermediate layer should be capable of being made smooth in a relatively simple manner. The intermediate layer comprises a glass plate, preferably of fused silica or silicate glass, which is cemented to the carrier body. For the carrier body, particularly a high-strength hardened Al-alloy can be used.

8 Claims, 1 Drawing Sheet

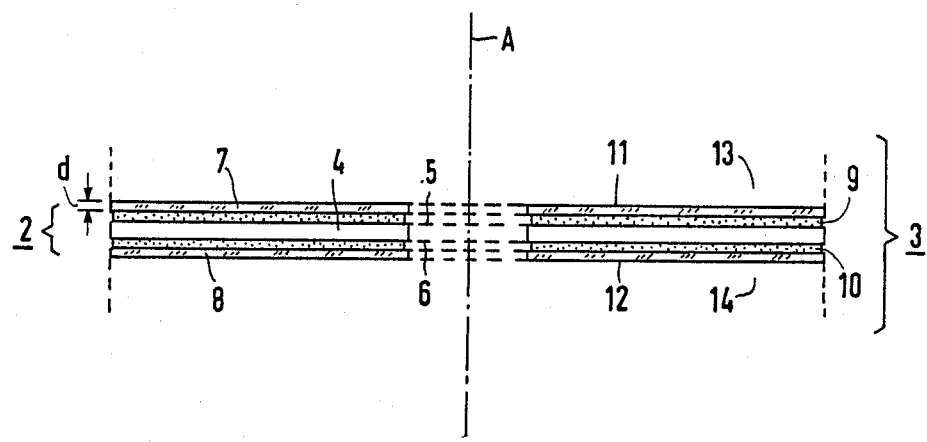

RECORDING MEDIUM THAT CAN BE MAGNETIZED VERTICALLY AND METHOD FOR MANUFACTURING SAME

This application is a continuation, of application Ser. No. 840,877, filed 3/18/86 now abandoned.

BACKGROUND OF THE INVENTION

The present invention relates to a recording medium that can be magnetized vertically, having a plate shaped carrier body of nonmagnetic material, the at least one flat side of which is provided with a thin nonmagnetic intermediate layer having a very smooth surface, to which at least one magnetic recording layer of a material is applied, the axis of easy magnetization of which points in a direction perpendicular to the surface of the medium. Such a recording medium is known, for instance, from German Pat. No. 29 23 682. The invention further relates to methods for the manufacture of such recording media.

The principle of vertical magnetization for storing information in special recording media is generally known. (See, for instance, "IEEE Transactions on Magnetics", vol. MAG-16, no. 1, January 1980, pages 71 to 76, or U.S. Pat. No. 4,287,544). The recording media which are to be provided for this principle, frequently also called vertical magnetization, can also be present, for instance, in the form of rigid magnetic recording discs. Such a recording medium comprises at least one magnetizable recording layer of predetermined thickness which contains a magnetically anisotropic material, especially of a CoCr alloy. The axis of the so-called easy magnetization of this layer points perpendicularly to the surface of the medium. By means of special magnetic heads, the individual pieces of information can then be written along a track as bits in successive sections, also called cells or blocks, by appropriate magnetization of the recording layer. The bits have a predetermined dimension, also called wavelength, in the longitudinal direction of the track. This dimension can be substantially smaller than the limit given by the demagnetization with storage according to the known principle of longitudinal (horizontal) magnetization. Thus, the amount of information stored in the special recording media can be increased accordingly by vertical magnetization.

The recording media provided on one or both sides with at least one magnetic recording layer must have an extremely smooth surface in order thus to avoid difficulties in guiding the magnetic heads over these surfaces, since the guidance height, also called flying height, of the heads is generally less than 1 $\mu$m (see the above cited German patent). Consequently, also the disc-shaped disc carrier or an intermediate layer applied to it, on which then the at least one recording layer must be deposited, must have an accordingly small surface roughness. The carrier body or the intermediate layer is therefore generally polished to a correspondingly smooth mirror surface.

Accordingly, in the recording medium known from the cited German Pat. No. 29 23 682, its disc-shaped carrier body of nonmagnetic material such as an Al-alloy, designated as the base plate, is first subjected on at least one flat side to a facing-off and heat-smoothing process. Onto the so pre-treated carrier body is then plated an intermediate layer of a nonmagnetic material such as nickel-phosphorus with a thickness of about 50 $\mu$m. This intermediate layer is subsequently finely processed mechanically by polishing to a mirror surface with a surface roughness of 0.04 $\mu$m or less and a thickness of about 30 $\mu$m. To this mirror surface are then applied several recording layers of magnetic metal, their axis of easy magnetization extending in the direction perpendicular to the surface of the recording medium. A special protective layer is finally deposited on the stratified structure so obtained. In the manufacture of this known recording medium, however, the process step of polishing the intermediate layer, in which special intermediate anneals must be performed, is relatively costly.

From DE-OS No. 30 14 718 is further known a multilayer magnetic thin film disc as a recording medium, the disc-shaped carrier body of which consists of aluminum or an aluminum alloy and especially of the aluminum-magnesium alloy AlMg$_5$. This carrier body is coated with a thin layer, for instance, 1 $\mu$m thick, of a synthetic resin, to which at least one metallic magnetic layer is then applied as the recording layer. So that a magnetic head can be guided over this thin film disc at the required low flying height, also the carrier body of this disc must of necessity be subjected to a suitable polishing process which may in particular be a so-called gloss treatment. However, the danger exists that the relatively soft material of the AlMg alloy preferentially used is plastically deformed, i.e., that the disc-shaped carrier body becomes wavy.

SUMMARY OF THE INVENTION

It is therefore an object of the present invention to provide a recording medium of the type mentioned above, the intermediate layer of which can be provided with a very smooth surface in a relatively simple manner.

The above and other objects of the present invention are achieved by a recording medium that can be magnetized vertically, comprising a plate-shaped carrier body of nonmagnetic material, the at least one flat side of which is provided with a thin nonmagnetic intermediate layer having a very smooth surface, at least one magnetic recording layer being applied thereto comprising a material, the axis of easy magnetization of which points in a direction perpendicular to the surface of the medium, the intermediate layer comprising a glass plate cemented to the carrier body.

The advantages connected with the embodiment of the recording medium according to the invention are, in particular, that the plate-shaped carrier body can be provided with the nonmagnetic intermediate layer of glass in a simple manner. The surface of this glass, to which the at least one magnetic recording layer is to be applied, can be worked very smooth without problems by polishing.

The recording medium according to the invention can be manufactured advantageously by cementing the intermediate layer comprising the glass plate to the carrier body before the at least one magnetic recording layer is applied to this so formed magnetic layer body. Also, the at least one magnetic recording layer can advantageously be applied first to the intermediate layer consisting of the glass plate. The glass disc so coated can then be cemented to the carrier body.

BRIEF DESCRIPTION OF THE DRAWING

The invention will be explained in greater detail in the following detailed description with reference to the single drawing FIGURE which shows schematically a cross section through part of a recording medium according to the invention.

DETAILED DESCRIPTION

With reference now to the drawing, the single FIGURE shows a schematic cross section through part of a recording medium. A magnetic layer carrier, designated 2 in the FIGURE, of a magnetic storage plate which is provided as the recording medium 3 and is rotation-symmetrical to an axis A, has a sandwich-like design. It comprises a central plate-shaped substrate 4 of nonmagnetic material. Preferably, this body comprises a hardenable aluminum alloy, the strength of which is distinctly greater than that of the relatively soft, non-hardenable AlMg alloy which is used, for instance, for the magnetic storage plate known from DE-OS No. 30 14 718. A suitable material is, for instance, an AlCuMgPb kneading alloy with a tensile strength $\sigma_z$ of about 400 N/mm$^2$ or an AlCuMg kneading alloy with an $\sigma_z$ of about 380 N/mm$^2$, while the known AlMg$_4$ alloy has a $\sigma_z$ of only about 250 N/mm$^2$. The substrate 4 should furthermore have flat sides 5 and 6 with a surface roughness of less than 1 to 2 $\mu$m and preferably at most 500 nm. The mentioned values for the surface flatness represent the maximally permissible deviation of the flat sides 5 and 6 from a corresponding ideally plane surface. To achieve this flatness, the flat sides can be polished appropriately, for instance, by gloss machining or lapping. To the two smooth flat sides 5 and 6 of this plate-shaped substrate 4, thin glass plates, 7 and 8, respectively, are cemented as the nonmagnetic intermediate layers, the corresponding cement layers being designated with 9 and 10. Suitable adhesives include two-component methacrylate adhesives or also one-component epoxyresin plastics. The cemented on glass plates 7 and 8 with a thickness d of, for instance, at most 1 mm and preferably between 300 and 600 $\mu$m may comprise, in particular, fused silica or silicate glasses. They should have very smooth surfaces 11 and 12 with a surface roughness defined by the maximum roughness depth, $R_t$, of at most 40 nm and preferably less than 20 nm, referred to a measuring distance of 2 mm. The quantity $R_t$ is understood here to mean, within the predetermined measuring distance, the distance which is formed between an upper boundary line which touches the surface profile at its highest profile elevation and a lower boundary line parallel thereto which touches the surface profile at its lowest profile valley (see also the 1978 draft of DIN 4762). To the surfaces of the so formed magnetic layer carrier 2 are then applied in a manner known per se the magnetic layers 13 and 14 which are required for perpendicular (vertical) magnetization but are not detailed in the FIGURE, and of which the axis of easy magnetization points in the direction of the normal relative to the surfaces 11 and 12, and protective layers that may be required.

This application of the magnetic recording layers as well as of the protective layers can be accomplished in the cemented sandwich assembly of the magnetic layer carrier 2 in a manner known per se, for instance, by means of a sputtering process. However, it is also possible first to provide the glass plates, lying individually, on their respective smooth sides, with these layers and to then cement these plates, coated in this manner, to the plate-shaped carrier body.

As compared to a plate-shaped carrier body, polished by gloss machining, of an AlMg-alloy according to DE-OS No. 30 14 718, the design of the magnetic-layer carrier 2 according to the invention has a number of advantages:

1. The danger of plastic deformations during the gloss machining of the known soft AlMg plates as the carrier bodies can be eliminated by using high-strength hardened Al alloys.
2. The expensive process step of gloss machining can optionally be omitted entirely or is at least simplified greatly.
3. Special intermediate anneals during gloss machining are not necessary.
4. The hardenable Al alloys which can be used according to the invention are generally less expensive than the highest purity AlMg alloys.
5. Since the surfaces 11 and 12 of the magnetic-layer carrier 2 consist of glass, they can easily be worked very smooth by polishing methods known per se.

According to the embodiment shown, it was assumed that the recording medium according to the invention has a magnetic-layer carrier provided with magnetic recording layers on both sides. Recording media coated on one side can also be designed accordingly.

List Of Reference Symbols

2—Magnetic Layer Carrier
3—Recording Medium
A—Axis
4—Carrier Body
5, 6—Flat Side
7 8—Glass Plate
9, 10—Adhesive Layer
11, 12—Glass Surface
13, 14—Magnetic Layer In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. A recording medium that can be magnetized vertically, comprising a plate-shaped carrier body of nonmagnetic material having at least one flat side provided with a thin smooth surface, at least one magnetic recording layer being applied thereto comprising a material, the axis of each magnetization of which points in a direction perpendicular to the surface of the medium, the intermediate layer comprising a prefabricated and polished glass plate cemented to the carrier body by means of an adhesive material, said glass plate having a thickness of at least 300 $\mu$m and at most 1 mm and having a maximum surface roughness which is less than 40 nm and preferably less than 20 nm, said maximum surface roughness thickness of said adhesive material being of the same order of magnitude as the thickness of said glass plate, the surface flatness of the flat side of the carrier body facing the intermediate layer being less than 2 $\mu$m and preferably less than 500 nm.

2. The recording medium recited in claim 1 wherein the carrier body comprises a high-strength hardened Al-alloy.

3. The recording medium recited in claim 2 wherein the carrier body comprises one of an AlCuMg or an AlCuMgPb kneading alloy.

4. The recording medium recited in claim 1 wherein the intermediate layer comprises a glass plate having a thickness of at most 600 μm.

5. The recording medium recited in claim 1 wherein the glass plate forming the intermediate layer comprises one of fused silica or silicate glass.

6. The recording medium recited in claim 1 wherein the intermediate layer comprising the glass plate is attached to the support body by one of a methacrylate adhesive or an epoxy resin plastic.

7. A method for manufacturing a recording medium that can be magnetized vertically, the recording medium comprising a plate-shaped carrier body of nonmagnetic material having at least one flat side provided with a thin nonmagnetic intermediate layer having a very smooth surface, said intermediate layer comprising a prefabricated and polished glass plate, at least one magnetic recording layer being applied thereto comprising a material having an axis of easy magnetization pointing in a direction perpendicular to the surface of the medium, the method comprising the steps of cementing the intermediate layer comprising the glass plate to the carrier body by means of an adhesive material and subsequently applying the at least one magnetic recording layer to the surface of the intermediate layer, said intermediate layer having a thickness of at least 300 μm and at most 1 mm and having a maximum surface roughness being referred to a measurement distance of 2 mm in length, the thickness of said adhesive material being of the same order of magnitude as the thickness of said glass plate, the surface flatness of the flat side of the carrier body facing the intermediate layer being less than 2 μm and preferably less than 500 nm.

8. A method for manufacturing a recording medium that can be magnetized vertically, the recording medium comprising a plate-shaped carrier body of nonmagnetic material having at least one flat side provided with a thin nonmagnetic intermediate having a very smooth surface, said intermediate layer comprising a prefabricated and polished glass plate, at least one magnetic recording layer being applied thereto comprising a material having an axis of easy magnetization pointing in a direction perpendicular to the surface of the medium, the method comprising the steps of applying the at least one magnetic recording layer to the intermediate layer comprising the glass plate, and subsequently thereto, cementing the coated glass plate to the carrier body by means of an adhesive material, the glass plate having a thickness of at least 300 μm and at most 1 mm and having a maximum surface roughness which is less than 40 nm and preferably less than 20 nm, said maximum suface roughness being referred to a measurement distance of 2 mm in length, the thickness of said adhesive material being of the same order of magnitude as the thickness of said glass plate, the surface flatness of the flat side of the carrier body facing the intermediate layer being less than 2 μm and preferably less than 500 nm.

* * * * *